United States Statutory Invention Registration [19]

McWaters et al.

[11] Reg. Number: H996

[43] Published: Nov. 5, 1991

[54] HIGH RESOLUTION PAGE IMAGE DISPLAY SYSTEM

[75] Inventors: Lynn D. McWaters, Garland; Kenneth T. Lovelady, Irving, both of Tex.

[73] Assignee: Recognition Equipment Incorporated, Irving, Tex.

[21] Appl. No.: 233,993

[22] Filed: Aug. 16, 1988

Related U.S. Application Data

[63] Continuation of Ser. No. 4,953, Jan. 20, 1987, abandoned.

[51] Int. Cl.[5] ..... G09G 1/06

[52] U.S. Cl. ..... 340/728; 340/720; 340/723; 340/789; 340/793

[58] Field of Search ..... 340/720, 721, 723, 728, 340/729, 732, 734, 744, 789, 790, 791, 793, 799, 800; 358/280, 283, 284

[56] References Cited

U.S. PATENT DOCUMENTS

| | | | |
|---|---|---|---|
| 3,197,558 | 7/1965 | Ernst . | |
| 3,324,237 | 6/1967 | Cherry et al. . | |
| 3,373,437 | 3/1968 | Sweet et al. . | |
| 3,474,192 | 10/1969 | Webb . | |
| 3,604,846 | 9/1971 | Behane et al. . | |
| 3,681,605 | 8/1972 | Schmitt . | |
| 3,681,650 | 8/1972 | Koll . | |
| 3,928,718 | 12/1975 | Sagae et al. . | |
| 3,977,007 | 8/1976 | Berry et al. . | |
| 4,032,977 | 6/1977 | Liao | 358/280 |
| 4,032,978 | 6/1977 | Wong | 358/283 |
| 4,084,259 | 4/1978 | Cahill et al. | 364/900 |
| 4,124,870 | 11/1978 | Schatz et al. | 358/260 |
| 4,210,936 | 7/1980 | Cinque et al. | 358/283 |
| 4,280,144 | 7/1981 | Bacon | 358/280 |
| 4,342,051 | 7/1982 | Suzuki et al. | 358/283 |
| 4,447,831 | 5/1984 | Adsett | 358/283 |
| 4,528,693 | 7/1985 | Pearson et al. | 340/793 |
| 4,532,651 | 7/1985 | Pennebaker, Jr. et al. | 358/284 |
| 4,599,656 | 7/1986 | Bellinghausen | 358/284 |
| 4,658,246 | 4/1987 | Kuperman | 340/793 |
| 4,682,869 | 7/1987 | Itoh et al. | 358/284 |

*Primary Examiner*—Bernarr E. Gregory

*Attorney, Agent, or Firm*—Ross, Howison, Clapp & Korn

[57] ABSTRACT

A page image display system (10) is provided for converting high resolution digitized raster scan data of an image to a lower resolution for display on a cathode ray tube display (38) is provided. The system (10) includes circuitry (26, 28, 32) for extracting a selected group of black/white picture elements from the raster scan data. The selected group of picture elements is applied to a lookup table (34) for converting the black/white picture elements to a single gray level picture element for display on the cathode ray tube display (38).

5 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH RESOLUTION PAGE IMAGE DISPLAY SYSTEM

This application is a continuation of application Ser. No. 4,953, filed Jan. 20, 1987, now abandoned.

TECHNICAL FIELD

This invention relates to image processing systems, and more particularly to a high resolution cathode ray tube display system.

BACKGROUND ART

Document processing systems optically and electronically read information from documents, and such information may be stored if not used immediately for processing or subsequently displayed to an operator via a terminal or workstation. Numerous processing systems may lift portions of the image of a document due to the size of the document with respect to the display capability of the terminal such as, for example, a cathode ray tube (CRT).

Present day resolution limits of cathode ray tubes using a 60 Hertz frame refresh rate are approximately 1280 elements in the horizontal direction and 1024 lines in the vertical direction. The CCITT Group III FAX standard for high resolution transmission is 0.005 inches by 0.005 inches. For a document of the size of 8.5 inches by 11 inches cathode ray tube displays require a size of 1728 element by 2200 element. From a comparison of a cathode ray tube resolution and the Group III FAX resolution, it can be seen that an entire standard page cannot be directly, point for point, displayed on a cathode ray tube at a 60 Hertz refresh rate.

The problem of displaying a full image such as one having dimensions 8.5 inches by 11 inches has been addressed by changing the refresh frame rate such as, for example, using a cathode ray tube with a 30 Hertz frame rate. Additionally, a technique for displaying a full page involves the use of thinning the image to display every other element and every other line. The thinning operation results in missing parts of characters which become hard to read.

A need has thus arisen for an image processing system for displaying images of full pages on a standard cathode ray tube. As cathode ray tube resolution improves, so will the requirements for increased FAX resolution and therefore a need will remain for an improved image display method.

DISCLOSURE OF THE INVENTION

In accordance with the present invention, a page image display system is provided which substantially eliminates the problems heretofore associated with displaying images of full pages on a cathode ray tube by retaining high resolution quality using a low resolution cathode ray tube.

In accordance with one aspect of the present invention, an image processing system for converting high resolution black/white picture element rasterized scan data of an image to a lower resolution for display on a cathode ray tube is provided. Circuitry is provided for extracting a selected group of black/white picture elements from the raster scan data. Circuitry is further provided for converting the extracted group of black/white picture elements to a single gray level picture element for displaying on the cathode ray tube.

DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION

Figure 1:
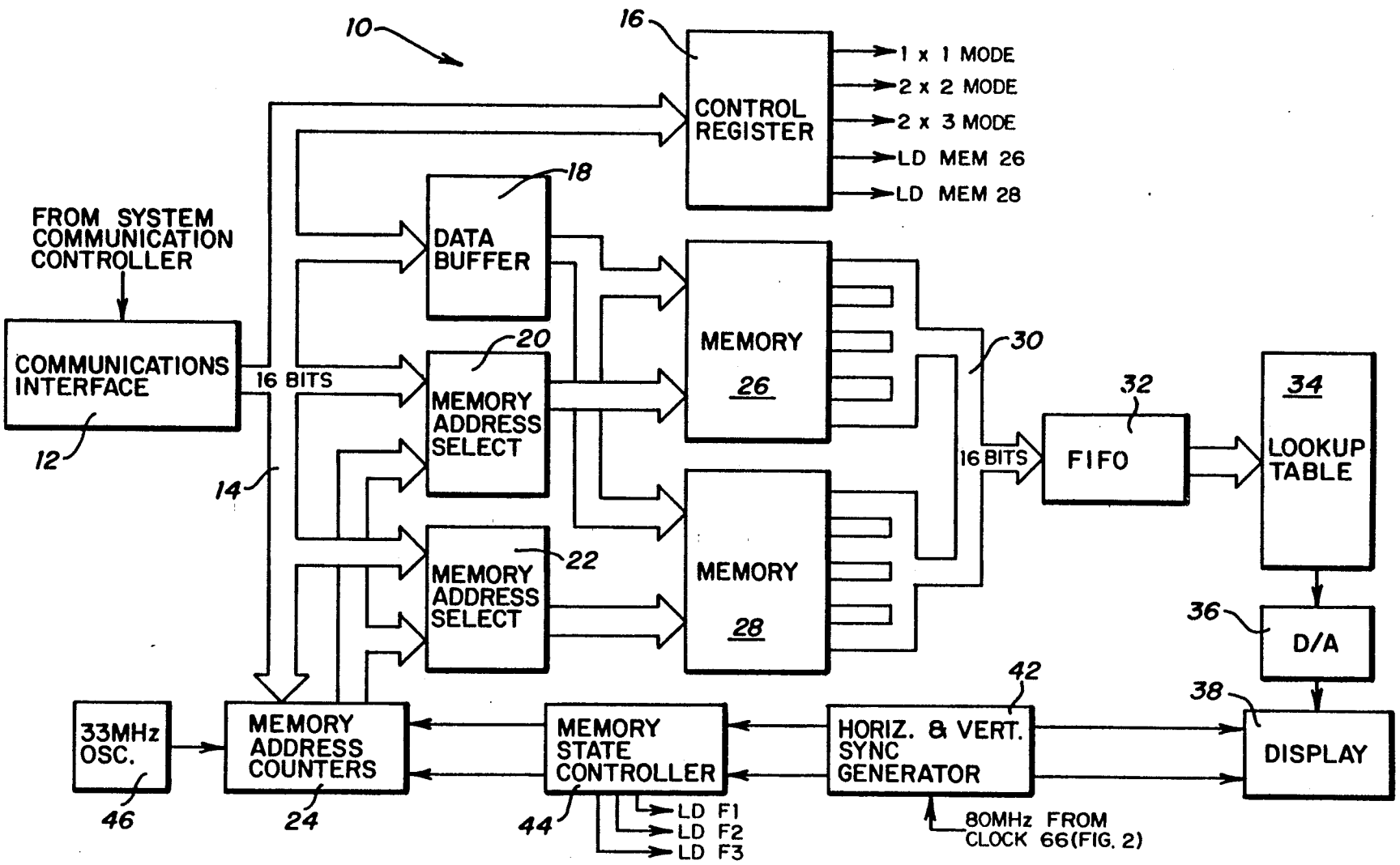
FIG. 1 is a block diagram of the present page image display system.

Referring to FIG. 1, a block diagram of the present page image display system is illustrated and is generally identified by the numeral 10. High resolution digitized raster scan data in the form of black/white cells or picture elements are supplied from a system communication controller to display system 10 via a communications interface 12. Communications interface 12 may comprise, for example, a serial communication interface or a parallel bus interface. Picture element data from communications interface 12 is routed via a bus 14 to a control register 16, a data buffer 18, memory address select 20 and 22 and memory address counters 24. Routing of the data via bus 14 is controlled by information decoded in communications interface 12.

The output of data buffer 18 is alternately applied to memories 26 and 28 whose outputs are combined via a 16-bit bus 30 to a first-in first-out buffer 32. The operation of first-in first-out buffer 32 will be subsequently described with respect to FIG. 2. The output of first-in first-out buffer 32 representing preselected groups of black/white picture elements is applied to a lookup table 34. Lookup table 34 provides lower resolution picture element data which is applied to a digital-to-analog converter 36 for display on a cathode ray tube display 38. The present page image display system 10 therefore operates to convert a high resolution digitized raster scan black/white picture elements to a lower resolution picture elements having preselected gray scale levels for display on cathode ray tube display 38.

Display 38 receives an input from a horizontal and vertical synchronization generator 42 which is clocked by an 80 MHz oscillator. Generator 42 synchronizes the memory accesses with the display scan and frame rates of display 38. Horizontal and vertical synchronization generator 42 provides synchronization information to a memory state controller 44 whose output is applied to memory address counters 24. Memory state controller 44 controls the incrementing of the address counters within memory address counters 24 and synchronizes the loading of the memory 26 and 28 and the output of data to first-in first-out buffers 32. Memory state controller 44 also generates the LD F1, LD F2 and LD F3 signals, which are applied to first-in first-out buffers 32. Memory address counters 24 receive a clock signal from a 33 MHz oscillator 46.

Still referring to FIG. 1, control register 16 determines the mode of the display function for the digital black/white data stored in memories 26 and 28. The various modes of the present page image display system 10 refer to the amount of data combination that will take place from memories 26 and 28 to the cathode ray tube display 38. The $1\times1$ mode refers to 1-bit in the memory 26 or 28 corresponding to one point on the cathode ray tube display 38. The $2\times2$ mode refers to the combination of a 2×2 square of picture element data or four picture elements in the memory 26 or 28 to 1 gray value on the face of the cathode ray tube display 38. The 2×3 mode refers to the combination of a 2 horizontal by 3 vertical rectangle of black/white data or six picture elements in the memory 26 or 28 to one gray value on the face of cathode ray tube display 38.

Control register 16 further functions to generate a control signal, LD MEM, to determine which memory 26 or 28 receives data from data buffer 18 as well as for transferring data from memory 26 or 28 to first-in first-out buffer 32.

Data buffer 18 functions to synchronize the data between communications interface 12 and the memories 26 and 28. Memory address select 20 and 22 is utilized to select which address is to be used for the address in the respective memories 26 and 28, that is, the address from memory address counters 24 or the address from the communications interface 12 itself, memory reading and writing, respectively.

Memory address counters 24 further function to address horizontal and vertical points within memories 26 and 28 and can be preset through communications interface 12 via bus 14 to effect a pan/scroll function of the data out of memories 26 and 28. Memories 26 and 28 are alternately selected for loading and displaying images so that there is no operator wait time in processing the images.

Figure 2:
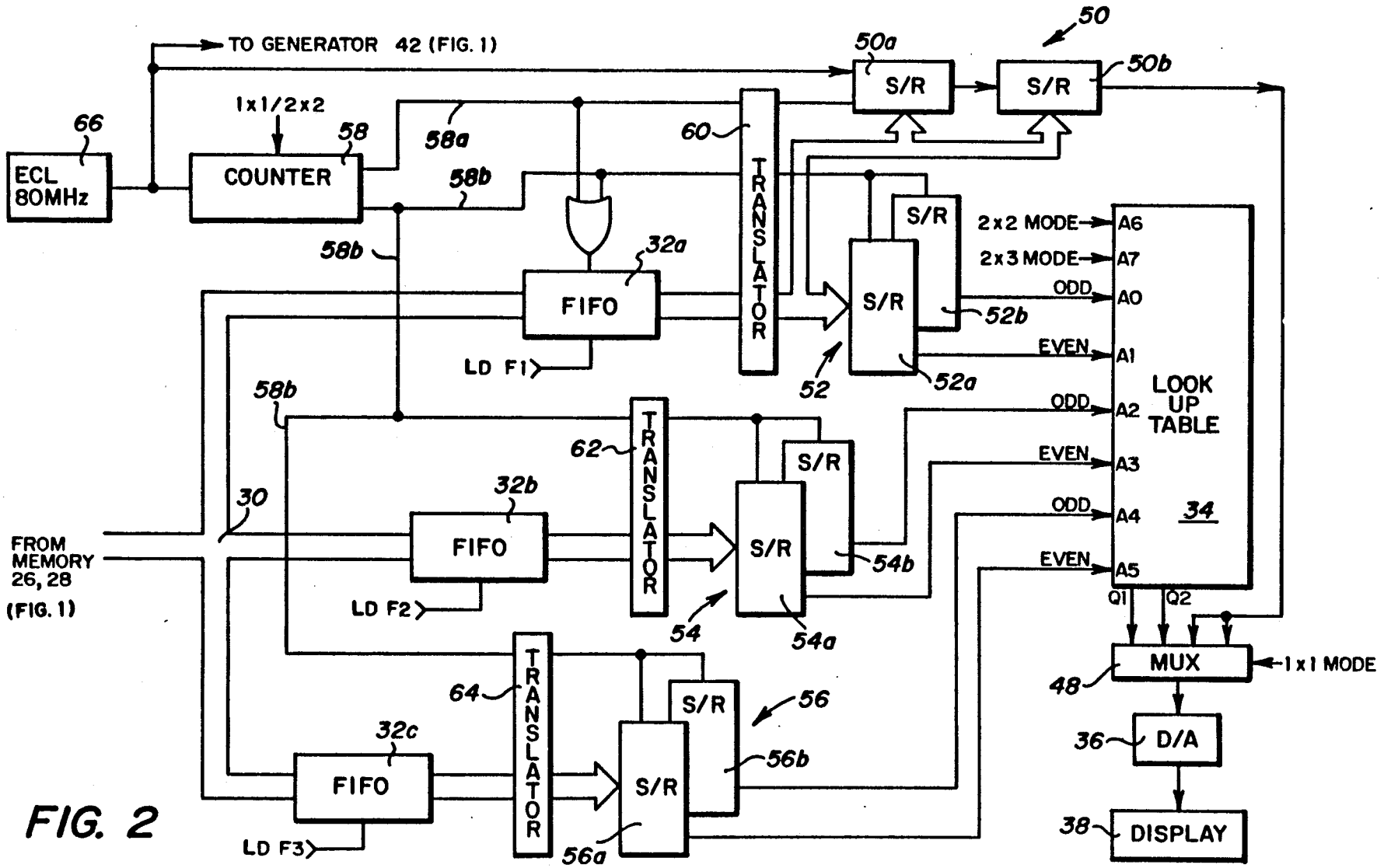
FIG. 2 is a block diagram of the present page image display system illustrating in more detail the buffer and look up table circuitry.

Referring simultaneously to FIGS. 1 and 2, black/-white digitized data from memories 26 and 28 via bus 30 is applied to first-in first-out buffer 32 which comprises three line scan buffers 32*a*, 32*b* and 32*c*. Buffers 32*a*, 32*b* and 32*c* buffer, in parallel, the data from three sequential scans at the same horizontal, 64-bit word location, and then passes such data to lookup table 34. The data is combined according to the mode selected and is output to a multiplexer 48 and via digital-to-analog converter 36 to cathode ray tube display 38.

Data memories 26 and 28 are configured for a 16-bit wide input data path, and in order to reduce the memory speed requirement for memory output, the output data path is 64-bits or four words wide. The four parallel data words are multiplexed down to a 16-bit path by enabling outputs of four Tri-State latches (not shown) in sequence which passes this information to scan buffers 32*a*, 32*b* and 32*c*.

The memory state controller 44 (FIG. 1) loads the first four multiplexed data words (64 bits) from scan 1 into scan buffer 32*a* using the LD F1 signal. The second four data words which are generated from scan 2 are loaded into scan buffer 32*b* using the LD F2 signal, and the third group of four data words from scan 3 are loaded into scan buffer 32*c* using the LD F3 signal. The fourth group of four data words, which are from scan 1, are loaded into scan buffer 32*a* which also contains a first scan 1 data. This data distribution into scan buffers 32*a*, 32*b* and 32*c* continues until the end of the current scan. The scan line counter is incremented to scan number 4 and the process is repeated, loading scans 4, 5 and 6 into scan buffers 32*a*, 32*b* and 32*c*, respectively. In order to simplify the operation of the present system, all scan buffers 32*a*, 32*b* and 32*c* are loaded even if the selected mode does not require data from all three scan buffers 32*a*, 32*b* or 32*c*.

The contents of scan buffers 32*a*, 32*b* and 32*c* are clocked into serial shift registers 50, 52, 54 and 56 by a counter 58. Shift registers 50, 52, 54, and 56 each comprise an 8-bit parallel to serial shift register and include an even bit and an odd bit portion, for example, shift register 50*a* receives even bits while shift register 50*b* receives odd bits. The data applied to shift registers 50 and 52 is applied from scan buffer 32*a* through a voltage translator 60. The data loaded into shift register 54 is applied from scan buffer 32*b* through a voltage translator 62. The data input to shift register 56 from scan buffer 32*c* is applied through a voltage translator 64.

Counter 58 receives a clock rate of 80 MHz from a clock source 66 which is divided by counter 58 for the desired mode of operation of the present page image display system 10. The clock rate is 80 MHz divided by 16 for the 1×1 mode or signal line 58*a* and the 80 MHz rate is divided by 8 for the 2×2 and 2×3 modes a signal line 58*b* which split the word into 8 odd bits and 8 even bits for the combining process. If the 1×1 mode is selected, no combining takes place and black/white data is serially shifted out of shift register 50 directly through multiplexer and digital-to-analog converter 36 for display on cathode ray tube display 38.

When the present page image display system 10 operates in the mode 2×2 the odd and even picture elements from shift registers 52 and 54 are serially shifted into lookup table 34. Lookup table 34 is comprised of, for example, a 256×4-bit programmable read only memory, which is manufactured and sold by Fairchild, Model F100416. The four picture elements applied to lookup table 34 on the A0, A1, A2 and A3 inputs are then combined into a 2-bit gray picture element value according to the lookup table which is shown in Table 1 below.

TABLE 1

| MODE | | DATA | | | | | | | |
|---|---|---|---|---|---|---|---|---|---|
| A 7 | A 6 | A 5 | A 4 | A 3 | A 2 | A 1 | A 0 | Q 2 | Q 1 |
| 1 | 0 | X | X | 0 | 0 | 0 | 0 | 0 | 0 |
| 1 | 0 | X | X | 0 | 0 | 0 | 1 | 0 | 0 |
| 1 | 0 | X | X | 0 | 0 | 1 | 0 | 0 | 0 |
| 1 | 0 | X | X | 0 | 0 | 1 | 1 | 0 | 1 |
| 1 | 0 | X | X | 0 | 1 | 0 | 0 | 0 | 0 |
| 1 | 0 | X | X | 0 | 1 | 0 | 1 | 0 | 1 |
| 1 | 0 | X | X | 0 | 1 | 1 | 0 | 0 | 1 |
| 1 | 0 | X | X | 0 | 1 | 1 | 1 | 1 | 0 |
| 1 | 0 | X | X | 1 | 0 | 0 | 0 | 0 | 0 |
| 1 | 0 | X | X | 1 | 0 | 0 | 1 | 0 | 1 |
| 1 | 0 | X | X | 1 | 0 | 1 | 0 | 0 | 1 |
| 1 | 0 | X | X | 1 | 0 | 1 | 1 | 1 | 0 |
| 1 | 0 | X | X | 1 | 1 | 0 | 0 | 0 | 1 |
| 1 | 0 | X | X | 1 | 1 | 0 | 1 | 1 | 0 |
| 1 | 0 | X | X | 1 | 1 | 1 | 0 | 1 | 0 |
| 1 | 0 | X | X | 1 | 1 | 1 | 1 | 1 | 1 |

In the above table, an "A" "1" represents a black picture element while an "A" "0" represents a white picture element. The "X" represents don't care inputs. The Q2 and Q1 outputs of lookup table 34 represent gray picture element values such that where Q2 and Q1 are both 0, the output is a white picture element; where Q2 is 0 and Q1 is a 1 the output is a light gray; where Q1 is a 1 and Q2 is a 0 the output is a dark gray picture element; and where both Q2 and Q1 are a 1 the output is a black picture element. The A7 mode is selected in Table 1.

When a 2×3 combination mode is selected, the six picture elements from the odd and even outputs of shift registers 52, 54 and 56 are combined by lookup table 34 to generate a 2-bit gray picture element value. The six picture elements are combined, for example, according to Table 2 containing information similar to Table 1. Table 2 appears below. The A6 mode is selected in Table 2. The Q2 and Q1 outputs representing gray level picture elements are such that when none of the six elements are black, Q2 and Q1 are both 0, and the output is a white picture element; if two of the six picture elements are black, the output of Q2 is 0 and Q1 is a 1 representing a light gray picture element; if three or four of the six picture elements are black, a dark gray picture element is output by lookup table 34 represented by Q2 being a 1 and Q1 being a 0; and if five or six of the six picture elements are black, the output of lookup table 34 represents a black picture element such that Q2 and Q1 are both 1.

TABLE 2

| MODE | | DATA | | | | | | | | MODE | | DATA | | | | | | | |
|---|---|---|---|---|---|---|---|---|---|---|---|---|---|---|---|---|---|---|---|
| A 7 | A 6 | A 5 | A 4 | A 3 | A 2 | A 1 | A 0 | Q 2 | Q 1 | A 7 | A 6 | A 5 | A 4 | A 3 | A 2 | A 1 | A 0 | Q 2 | Q 1 |
| 0 | 1 | 0 | 0 | 0 | 0 | 0 | 0 | 0 | 0 | 0 | 1 | 1 | 0 | 0 | 0 | 0 | 0 | 0 | 0 |
| 0 | 1 | 0 | 0 | 0 | 0 | 0 | 1 | 0 | 0 | 0 | 1 | 1 | 0 | 0 | 0 | 0 | 1 | 0 | 1 |
| 0 | 1 | 0 | 0 | 0 | 0 | 1 | 0 | 0 | 0 | 0 | 1 | 1 | 0 | 0 | 0 | 1 | 0 | 0 | 1 |
| 0 | 1 | 0 | 0 | 0 | 0 | 1 | 1 | 0 | 1 | 0 | 1 | 1 | 0 | 0 | 0 | 1 | 1 | 1 | 0 |
| 0 | 1 | 0 | 0 | 0 | 1 | 0 | 0 | 0 | 0 | 0 | 1 | 1 | 0 | 0 | 1 | 0 | 0 | 0 | 1 |
| 0 | 1 | 0 | 0 | 0 | 1 | 0 | 1 | 0 | 1 | 0 | 1 | 1 | 0 | 0 | 1 | 0 | 1 | 1 | 0 |
| 0 | 1 | 0 | 0 | 0 | 1 | 1 | 0 | 0 | 1 | 0 | 1 | 1 | 0 | 0 | 1 | 1 | 0 | 1 | 0 |
| 0 | 1 | 0 | 0 | 0 | 1 | 1 | 1 | 1 | 0 | 0 | 1 | 1 | 0 | 0 | 1 | 1 | 1 | 1 | 0 |
| 0 | 1 | 0 | 0 | 1 | 0 | 0 | 0 | 0 | 0 | 0 | 1 | 1 | 0 | 1 | 0 | 0 | 0 | 0 | 1 |
| 0 | 1 | 0 | 0 | 1 | 0 | 0 | 1 | 0 | 1 | 0 | 1 | 1 | 0 | 1 | 0 | 0 | 1 | 1 | 0 |
| 0 | 1 | 0 | 0 | 1 | 0 | 1 | 0 | 0 | 1 | 0 | 1 | 1 | 0 | 1 | 0 | 1 | 0 | 1 | 0 |
| 0 | 1 | 0 | 0 | 1 | 0 | 1 | 1 | 1 | 0 | 0 | 1 | 1 | 0 | 1 | 0 | 1 | 1 | 1 | 0 |
| 0 | 1 | 0 | 0 | 1 | 1 | 0 | 0 | 0 | 1 | 0 | 1 | 1 | 0 | 1 | 1 | 0 | 0 | 1 | 0 |
| 0 | 1 | 0 | 0 | 1 | 1 | 0 | 1 | 1 | 0 | 0 | 1 | 1 | 0 | 1 | 1 | 0 | 1 | 1 | 0 |
| 0 | 1 | 0 | 0 | 1 | 1 | 1 | 0 | 1 | 0 | 0 | 1 | 1 | 0 | 1 | 1 | 1 | 0 | 1 | 0 |
| 0 | 1 | 0 | 0 | 1 | 1 | 1 | 1 | 1 | 0 | 0 | 1 | 1 | 0 | 1 | 1 | 1 | 1 | 1 | 1 |
| 0 | 1 | 0 | 1 | 0 | 0 | 0 | 0 | 0 | 0 | 0 | 1 | 1 | 1 | 0 | 0 | 0 | 0 | 0 | 1 |
| 0 | 1 | 0 | 1 | 0 | 0 | 0 | 1 | 0 | 1 | 0 | 1 | 1 | 1 | 0 | 0 | 0 | 1 | 1 | 0 |
| 0 | 1 | 0 | 1 | 0 | 0 | 1 | 0 | 0 | 1 | 0 | 1 | 1 | 1 | 0 | 0 | 1 | 0 | 1 | 0 |
| 0 | 1 | 0 | 1 | 0 | 0 | 1 | 1 | 1 | 0 | 0 | 1 | 1 | 1 | 0 | 0 | 1 | 1 | 1 | 0 |
| 0 | 1 | 0 | 1 | 0 | 1 | 0 | 0 | 0 | 1 | 0 | 1 | 1 | 1 | 0 | 1 | 0 | 0 | 1 | 0 |
| 0 | 1 | 0 | 1 | 0 | 1 | 0 | 1 | 1 | 0 | 0 | 1 | 1 | 1 | 0 | 1 | 0 | 1 | 1 | 0 |
| 0 | 1 | 0 | 1 | 0 | 1 | 1 | 0 | 1 | 0 | 0 | 1 | 1 | 1 | 0 | 1 | 1 | 0 | 1 | 0 |
| 0 | 1 | 0 | 1 | 0 | 1 | 1 | 1 | 1 | 0 | 0 | 1 | 1 | 1 | 0 | 1 | 1 | 1 | 1 | 1 |
| 0 | 1 | 0 | 1 | 1 | 0 | 0 | 0 | 0 | 1 | 0 | 1 | 1 | 1 | 1 | 0 | 0 | 0 | 1 | 0 |
| 0 | 1 | 0 | 1 | 1 | 0 | 0 | 1 | 1 | 0 | 0 | 1 | 1 | 1 | 1 | 0 | 0 | 1 | 1 | 0 |
| 0 | 1 | 0 | 1 | 1 | 0 | 1 | 0 | 1 | 0 | 0 | 1 | 1 | 1 | 1 | 0 | 1 | 0 | 1 | 0 |
| 0 | 1 | 0 | 1 | 1 | 0 | 1 | 1 | 1 | 0 | 0 | 1 | 1 | 1 | 1 | 0 | 1 | 1 | 1 | 1 |
| 0 | 1 | 0 | 1 | 1 | 1 | 0 | 0 | 1 | 0 | 0 | 1 | 1 | 1 | 1 | 1 | 0 | 0 | 1 | 0 |
| 0 | 1 | 0 | 1 | 1 | 1 | 0 | 1 | 1 | 0 | 0 | 1 | 1 | 1 | 1 | 1 | 0 | 1 | 1 | 1 |
| 0 | 1 | 0 | 1 | 1 | 1 | 1 | 0 | 1 | 0 | 0 | 1 | 1 | 1 | 1 | 1 | 1 | 0 | 1 | 1 |
| 0 | 1 | 0 | 1 | 1 | 1 | 1 | 1 | 1 | 1 | 0 | 1 | 1 | 1 | 1 | 1 | 1 | 1 | 1 | 1 |

It therefore can be seen that the present page image display system is operative to convert high resolution raster scan data in the form of black/white picture elements into lower resolution gray level picture element data for display on a cathode ray tube. The present invention therefore allows for the display of pages such as 8½ inches ×11 inches or 8½ inches ×14 inches in the 2×2 mode or 2×3 mode, respectively. Further, the value of the lookup table can be changed to change the appearance of the display.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. An image processing system for converting high resolution rasterized black/white picture element scan data of an image to a lower resolution multi-level gray value for display on a cathode ray tube comprising:

means for extracting a selected group of black/white picture elements from the rasterized scan data; and means for converting said selected group of black/-white picture elements to a variable brightness single gray level picture element for display on the cathode ray tube, the displayed gray level of said picture element being preselected based upon the number of occurrences of a black or a white picture element in said selected group to thereby reduce the number of picture elements displayed on the cathode ray tube while displaying the image at its actual size in gray level.

2. The image processing system of claim 1 wherein said selected group comprises a matrix of two picture elements wide and two picture elements tall.

3. The image processing system of claim 1 wherein said selected group comprises a matrix of three picture elements wide and two picture elements tall.

4. The image processing system of claim 1 wherein the selected group of picture elements includes four picture elements and if none or one of the picture elements of the group is black, a white picture element is displayed on the cathode ray tube; and if two picture elements of the group are black, a light gray picture element is displayed on the cathode ray tube; and if three picture elements of the group are black, a dark gray picture element is displayed on the cathode ray tube; and if all four of the picture elements of the group are black, a black picture element is displayed on the cathode ray tube.

5. The image processing system of claim 1 wherein the selected group of picture elements includes six picture elements and if none or one of the group are black, a white picture element is displayed on the cathode ray tube; and if two picture elements of the group are black, a light gray picture element is displayed on the cathode ray tube; and if three or four of the picture elements of the group are black, a dark gray picture element is displayed on the cathode ray tube; and if five or six of the picture elements of the group are black, a black picture element is displayed on the cathode ray tube.

* * * * *